United States Patent
Marchini et al.

(10) Patent No.: US 9,254,618 B2
(45) Date of Patent: Feb. 9, 2016

(54) METHOD FOR MANUFACTURING A TYRE AND APPARATUS FOR LAYING A REINFORCING ELEMENT ON A FORMING SUPPORT

(75) Inventors: Maurizio Marchini, Milan (IT); Marco Cantu', Milan (IT)

(73) Assignee: Pirelli Tyre S.p.A., Milan (IT)

(*) Notice: Subject to any disclaimer, the term of this patent is extended or adjusted under 35 U.S.C. 154(b) by 79 days.

(21) Appl. No.: 13/571,185

(22) Filed: Aug. 9, 2012

(65) Prior Publication Data

US 2012/0298305 A1 Nov. 29, 2012

Related U.S. Application Data

(62) Division of application No. 11/920,245, filed as application No. PCT/IT2005/000307 on May 30, 2005, now Pat. No. 8,262,822.

(51) Int. Cl.
*B29D 30/16* (2006.01)
*B29D 30/30* (2006.01)
(Continued)

(52) U.S. Cl.
CPC .......... *B29D 30/165* (2013.01); *B29D 30/1657* (2013.01); *B29D 30/305* (2013.01); *B29D 30/3057* (2013.01); *G05B 19/188* (2013.01); *B29D 2030/082* (2013.01); *B29D 2030/1685* (2013.01); *B29D 2030/3085* (2013.01)

(58) Field of Classification Search
CPC ............. B29D 30/165; B29D 30/1657; B29D 30/305; B29D 30/3057; B29D 2030/082; B29D 2030/1685; B29D 2030/3085; B29C 70/382; B29C 70/386; G05B 19/188; G05B 2219/49362
USPC .......................... 156/350, 355, 361, 397, 433
See application file for complete search history.

(56) References Cited

U.S. PATENT DOCUMENTS

| | | |
|---|---|---|
| 4,750,965 A | 6/1988 | Pippel et al. |
| 4,874,455 A | 10/1989 | Ginter |

(Continued)

FOREIGN PATENT DOCUMENTS

| | | |
|---|---|---|
| DE | 100 37 944 A1 | 3/2001 |
| EP | 1 022 118 A2 | 7/2000 |

(Continued)

OTHER PUBLICATIONS

Mizukusa: "Method and Apparatus for Pasting Up Tire Cord", Patent Abstracts of Japan, Publication No. 2004/358757, Published on Dec. 24, 2004.

(Continued)

*Primary Examiner* — Michael Tolin
(74) *Attorney, Agent, or Firm* — Finnegan, Henderson, Farabow, Garrett & Dunner, L.L.P.

(57) ABSTRACT

An apparatus for the deposition of at least one reinforcing element on a forming including at least one feeding unit of at least one reinforcing element at a forming support, at least one deposition unit of the at least one reinforcing element on the forming support, the at least one deposition unit including at least one presser member, a control unit of the at least one deposition unit, at least one detection device of the deviations between an actual deposition profile and a theoretical deposition profile along a first deposition path defined based upon the theoretical profile, and a processing unit to define, based upon said deviations, an actual deposition path of the at least one reinforcing element on the forming support.

16 Claims, 1 Drawing Sheet

(51) Int. Cl.
*G05B 19/18* (2006.01)
*B29D 30/08* (2006.01)

(56) References Cited

U.S. PATENT DOCUMENTS

| | | | |
|---|---|---|---|
| 5,281,289 | A | 1/1994 | Debroche et al. |
| 6,702,913 | B2 * | 3/2004 | Marchini et al. ............. 156/117 |
| 7,766,063 | B2 | 8/2010 | Lauder et al. |
| 2001/0023736 | A1 | 9/2001 | Mayet |
| 2003/0145932 | A1 * | 8/2003 | Holmes et al. ................. 156/64 |
| 2005/0076993 | A1 | 4/2005 | Pialot |
| 2007/0199661 | A1 | 8/2007 | Nicolas et al. |

FOREIGN PATENT DOCUMENTS

| | | |
|---|---|---|
| EP | 1 299 825 B1 | 4/2003 |
| KR | 2005-0019105 | 2/2005 |
| WO | WO 01/36185 A1 | 5/2001 |
| WO | WO 2005/000559 A1 | 1/2005 |

OTHER PUBLICATIONS

Korean Patent Office, Notice of Preliminary Rejection in Korean Patent Application No. 10-2007-7028085, Oct. 25, 2011, pp. 1-4.
International Preliminary Report on Patentability from International Application No. PCT/IT2005/000307, issued Dec. 6, 2007.

* cited by examiner

METHOD FOR MANUFACTURING A TYRE AND APPARATUS FOR LAYING A REINFORCING ELEMENT ON A FORMING SUPPORT

CROSS REFERENCE TO RELATED APPLICATION

This application is a divisional of U.S. application Ser. No. 11/920,245, filed Mar. 4, 2009, now U.S. Pat. No. 8,262,822, which is a national phase entry under 35 U.S.C. §371 from PCT International Application No. PCT/IT2005/000307, filed May 30, 2005, the content of which is incorporated herein by reference.

BACKGROUND OF THE INVENTION

1. Field of the Invention

The present invention relates to a method for manufacturing a tyre for vehicle wheels.

The invention also relates to an apparatus for the deposition of at least one reinforcing element on a forming support, said apparatus being able to be used to carry out the aforementioned method.

2. Description of the Related Art

Throughout the present description and the subsequent claims, the term "reinforcing element" is used to indicate an element comprising one or more thread-like reinforcing elements, such as textile or metallic cords, incorporated in, or coated with, a layer of elastomeric material.

It should also be specified that, in the present description and in the subsequent claims, the term "elastomeric material", is used to indicate a composition comprising at least one elastomeric polymer and at least one reinforcing filler. Preferably, such a composition also comprises additives such as, for example, a cross-linking agent and/or a plasticizer. Thanks to the provision of the cross-linking agent, such a material can be cross-linked through heating, so as to form the final product.

A tyre for vehicle wheels generally comprises a carcass structure comprising at least one carcass ply formed from reinforcing cords incorporated in an elastomeric matrix. The carcass ply has end flaps respectively engaged with annular anchoring structures arranged in the zones usually identified with the name "beads" and normally formed from a substantially circumferential annular insert on which at least one filling insert is applied in a radially outer position. Such annular structures are commonly identified as "bead cores".

In a radially outer position with respect to the carcass ply, a belt structure comprising one or more belt layers is associated, said belt layers being arranged radially one on top of the other and having textile or metallic reinforcing cords orientated so that they cross and/or so that they are substantially parallel to the direction of circumferential extension of the tyre.

Between the carcass structure and the belt structure there may be a layer of elastomeric material, known as "underbelt", having the function of making the radially outer surface of the carcass structure as uniform as possible for the subsequent application of the belt structure.

In a radially outer position with respect to the belt structure a tread band is applied, also made of elastomeric material like other structural elements forming the tyre.

Between the tread band and the belt structure a so-called "under-layer" made of elastomeric material with suitable properties to ensure a steady union of the tread band itself can be arranged.

On the side surfaces of the carcass structure, respective sidewalls made of elastomeric material are also applied, each extending from one of the side edges of the tread band up to the respective annular structure for anchoring to the beads.

In "tubeless" tyres, the carcass ply is internally coated by a layer of elastomeric material, preferably butylene-based, usually known as "liner", having optimal characteristics of air impermeability and extending from one bead to the other.

Conventional manufacturing processes of tyres for vehicle wheels essentially provide that the components of the tyre listed above be firstly made separately from each other and then are assembled in a subsequent tyre building step.

The current tendency is, however, that of using manufacturing processes that allow the production and storage of semi-finished products to be minimised or, possibly, eliminated.

More specifically, attention has now turned towards process solutions that allow the individual components of the tyre to be made by directly applying them, according to a predetermined sequence, onto the tyre being built on a forming support, typically toroidal or cylindrical.

For example, in document WO 01/36185 to the same Applicant, the components of the tyre are made on a toroidal support by sequentially depositing on the latter a plurality of reinforcing elements, consisting for example of individual rubberised cords or of rubberized cords grouped in parallel in the form of strip-like elements, particularly used in making the carcass and belt structure, and of continuous elongated elements made of elastomeric material, particularly used for making the other structural components of the tyre, such as, for example, tread band, sidewalls, liners, fillers.

It should be observed that in this case the manufacture of a tyre provides for an automated process substantially without intermediate storage of semi-finished products. In such a process the individual structural components of the tyre described above are manufactured according to a predetermined sequence starting from elongated elements fed by a delivery member that can be operatively associated with an extruder. Thereafter, such elongated elements are deposited on the forming support by means of at least one presser member acting on the elongated element along a pressing direction and mobile with respect to the forming support along a predetermined deposition path.

In patent EP 1 299 825 to the same Applicant, the design step of a tyre automatically generates a plurality of procedures, which substantially reproduce the deposition sequences of all of the structural components, determined in the design step, with which the plant for the manufacture of tyres makes the new models thereof. Such procedures, preferably each containing a deposition sequence of a structural element, are preferably located in a Data Base, from which they are suitably withdrawn to be sent to a corresponding manufacturing unit of the production plant.

The Applicant has perceived that a method like that described in EP 1 299 825 defines a priori the deposition path through software based upon a theoretical deposition profile on which the deposition of the elongated element shall be carried out. In particular, such software, after having received in input a series of information identifying the theoretical deposition profile, processes such information to calculate the spatial coordinates of a series of points defining the deposition path on the forming support.

In practice, the forming support on which the deposition of the reinforcing elements is carried out comprises, as well as the toroidal or cylindrical drum, a plurality of surface layers partially or totally overlapping and partially or totally consisting of elastomeric material. It results from this that, because of the dimensional tolerances of such layers, the actual deposition profile on which the deposition of the reinforcing element shall be carried out is different from the theoretical one used to define the deposition path through the aforementioned software. This can cause a non-optimal deposition of the reinforcing elements on the forming support.

SUMMARY OF THE INVENTION

In particular, the Applicant has verified that the deposition of the reinforcing elements on the forming support along a deposition path defined from a theoretical deposition profile can cause defects on the tyre, such as overlapping or undesired spaces between contiguous reinforcing elements.

The Applicant has thus felt the need to develop a method and an apparatus that allows, in a manufacturing process of tyres like the one described above, a deposition of the reinforcing elements to be carried out based upon the actual deposition profile, so as to ensure an optimal deposition and to thus ensure ever higher quality levels of the tyre.

The Applicant has found that this is possible by detecting the deviations between actual deposition profile and theoretical deposition profile along a first deposition path defined from a theoretical deposition profile and defining, based upon the detected deviations, an actual deposition path starting from the aforementioned first deposition path.

The present invention therefore relates, in a first aspect thereof, to a method for manufacturing a tyre for vehicle wheels, comprising the steps of:
building a carcass structure, comprising at least one carcass ply associated with annular anchoring structures, on a forming support;
building a belt structure in a radially outer position with respect to said carcass structure;
building a tread band in a radially outer position with respect to said belt structure;
wherein said at least one carcass ply, said annular anchoring structures and said belt structure each comprise at least one reinforcing element, deposited in a radially outer position with respect to said forming support;
wherein the deposition of at least one reinforcing element comprises the steps of:
setting a first deposition path of said at least one reinforcing element on said forming support based upon a theoretical deposition profile;
detecting the deviations between an actual deposition profile and said theoretical profile along said first deposition path;
defining, based upon said deviations, an actual deposition path of said at least one reinforcing element on said forming support;
depositing said at least one reinforcing element on said forming support along said actual deposition path.

Advantageously, the method of the present invention allows a deposition of the reinforcing elements to be carried out on the forming support along an actual deposition path calculated based upon the actual deposition profile determined starting from the profile of the forming support. Therefore, an optimal deposition of the reinforcing elements is carried out, avoiding defects, such as overlapping or undesired spaces between contiguous reinforcing elements. In this way it is possible to ensure high quality levels of the tyre.

In particular, in accordance with the present invention, the actual deposition path is calculated, from a theoretical deposition path, based upon the deviations detected between actual deposition profile and theoretical deposition profile.

Such deviations are due, for example, to the dimensional tolerances of possible surface layers previously deposited on the forming support.

Preferably, the step of setting a first deposition path comprises the following steps:
defining, through a calculation algorithm, said first deposition path;
controlling at least one deposition unit of said at least one reinforcing element to move at least one presser member of said deposition unit in a predetermined position with respect to said forming support, said predetermined position defining an initial position of said first deposition path;
setting a detection device to zero.

Advantageously, the aforementioned first deposition path can be defined a priori through a calculation algorithm. In particular, this is a software that, having received in input a series of information identifying the theoretical deposition profile, processes such information to calculate the spatial coordinates of a series of points. Such points define the theoretical deposition path.

In accordance with the present invention, the theoretical deposition path is the path along which the deviations between actual deposition profile and theoretical deposition profile are detected for the subsequent definition of the actual deposition path.

Even more advantageously, in the method of the present invention the detection device provides directly in output the deviations between actual deposition profile and theoretical deposition profile in virtue of the fact that it is set at zero before starting the detection step.

Preferably, in the aforementioned predetermined position said at least one presser member generates a predetermined elongation of an elastic element mechanically connected therewith. In such a way, said presser member detects both possible positive deviations (caused, for example, by the fact that the thickness of the surface layers previously deposited on the forming support is, at one of the detection points, greater than the theoretical one) and possible negative deviations (caused, for example, by the fact that the thickness of the surface layers previously deposited on the forming support is, at one of the detection points, lower than the theoretical one).

Preferably, said predetermined elongation is between about 2 mm and about 5 mm.

Preferably, the step of detecting the deviations between actual profile and theoretical profile comprises the steps of:
moving said at least one presser member along said first deposition path starting from, said predetermined position;
simultaneously detecting the deviations between actual profile and theoretical profile in a pressing direction of said at least one presser member on said forming support.

The detection of the deviations thus takes place whilst the presser member travels the aforementioned first deposition path.

In a first embodiment of the method of the present invention, the step of detecting the deviations between actual profile and theoretical profile is carried out in a setting step of the deposition cycle of said at least one reinforcing element on said forming support. In such a case, advantageously, the actuation of the detection step does not involve any increase in the machine time necessary to carry out the deposition cycle. This can be achieved, for example, in the deposition of the reinforcing elements to manufacture a belt layer of the tyre, where it is indeed foreseen that the deposition apparatus travels an idle cycle for initial setting.

In an alternative embodiment of the method of the present invention, the step of detecting the deviations between actual profile and theoretical profile is carried out in a first deposition step of a deposition cycle of said at least one reinforcing element on said forming support. This can be achieved, for example, in the deposition of the reinforcing elements for manufacturing the carcass plies of the tyre or in the deposition of the bead cores for manufacturing the anchoring structures of the carcass structure.

In a preferred embodiment of the method of the present invention, the step of defining an actual deposition path comprises the step of correcting said first deposition path based upon said deviations.

Advantageously, the calculation of the actual deposition path thus takes place only in the case in which deviations between actual profile and theoretical profile are detected. Even more advantageously, such a calculation simply provides for the correction of the coordinates of only those points of the first deposition path at which the deviations between actual profile and theoretical profile have been detected. This advantageously allows the computing burden required for defining the actual deposition path to be reduced to the minimum.

Preferably, the step of correcting said first deposition path is carried out only if said deviations are outside of a predetermined tolerance range. This allows the computing burden required for defining the actual deposition path to be further limited.

Preferably, said predetermined tolerance range is between about −1.5 mm and about +1.5 mm, more preferably between about −0.5 mm and about +0.5 mm.

In the preferred embodiment of the method of the present invention, the aforementioned forming support is a toroidal drum. Alternatively, the forming support can be a cylindrical support. Such a shape of the support can be useful for making some structural components of the tyre (like the belt structure or the tread band) in manufacturing processes of tyres that provides for manufacturing the different structural components of the tyre separately on many forming supports and their subsequent assembly to obtain the finished tyre.

Irrespective of the specific type of the forming support, preferably, it comprises one or more surface layers of elastomeric material previously deposited. In such a case, because of the large dimensional tolerances of the elastomeric material, it is absolutely probable that the actual deposition profile is different to the theoretical one. Advantageously, the method of the present invention allows optimal deposition of the reinforcing elements to also be carried out in such a circumstance.

Preferably, the aforementioned first deposition path extends along a deposition direction having at least one component parallel to a rotation axis of said forming support. In other words, the method of the invention is preferably used in the cases in which the reinforcing elements are deposited on the surface of the forming support according to a predetermined deposition angle with respect to a direction of circumferential development of the forming support itself, like for example in manufacturing the belt and/or carcass structure of the tyre and of the bead cores for the anchoring of the carcass structure.

In an embodiment of the method of the present invention, said at least one reinforcing element is applied onto said forming support in the form of a plurality of pieces of predetermined length cut from an element fed substantially continuously at said forming support. This is the case, for example, of the deposition of the reinforcing elements for manufacturing a belt layer of the tyre or for the manufacture of a carcass ply.

In an alternative embodiment of the method of the present invention, said at least one reinforcing element is applied onto said forming support in the form of a substantially continuous element. This is the case, for example, of the deposition of the bead cores for manufacturing the anchoring structures of the carcass structure.

In a second aspect thereof, the present invention relates to an apparatus for the deposition of at least one reinforcing element on a forming support, comprising:
- at least one feeding unit of at least one reinforcing element at a forming support;
- at least one deposition unit of said at least one reinforcing element on said forming support, said at least one deposition unit comprising at least one presser member;
- a control unit of said at least one deposition unit;
- at least one detection device of the deviations between an actual deposition profile and a theoretical deposition profile along a first deposition path defined based upon said theoretical profile;
- a processing unit to define an actual deposition path of said at least one reinforcing element on said forming support based upon said deviations.

Such an apparatus can advantageously be used to carry out the method of the present invention described above.

In a first embodiment of the apparatus of the present invention, said at least one detection device comprises at least one electromechanical position sensor.

In a second embodiment of the apparatus of the present invention, said at least one detection device comprises at least one optical position sensor.

Preferably, said at least one detection device is integrally associated with a frame of said apparatus and is active on said at least one deposition member to detect the displacements of said at least one presser member along a predetermined pressing direction.

In a further preferred embodiment, the apparatus of the present invention also comprises a cutting member to cut a plurality of pieces of predetermined length of said at least one reinforcing element on said forming support from at least one substantially continuous element and at least two presser members that are mobile away from each other to apply said pieces on said forming support.

Preferably, in such an embodiment of the apparatus of the present invention said at least two presser members are rolling presser members.

Such an embodiment is used, for example, in the deposition of the reinforcing elements for manufacturing a belt layer of the tyre and/or in the deposition of the reinforcing elements for manufacturing carcass plies of the tyre.

In a different preferred embodiment, said at least one reinforcing element is applied on said forming support in the form of a substantially continuous element.

Such an embodiment is used, for example, in the deposition of the bead cores for manufacturing the anchoring structures of the carcass structure.

In the preferred embodiments of the apparatus of the present invention, said forming support is a toroidal or cylindrical drum that, preferably, comprises one or more surface layers of elastomeric material previously deposited.

BRIEF DESCRIPTION OF THE DRAWINGS

Further characteristics and advantages of the present invention shall become clearer from the following detailed description of a preferred embodiment of an apparatus and of a method in accordance with the present invention, made with reference to the attached drawings. In such drawings.

DETAILED DESSCRIPTION OF THE INVENTION

Figure 1:
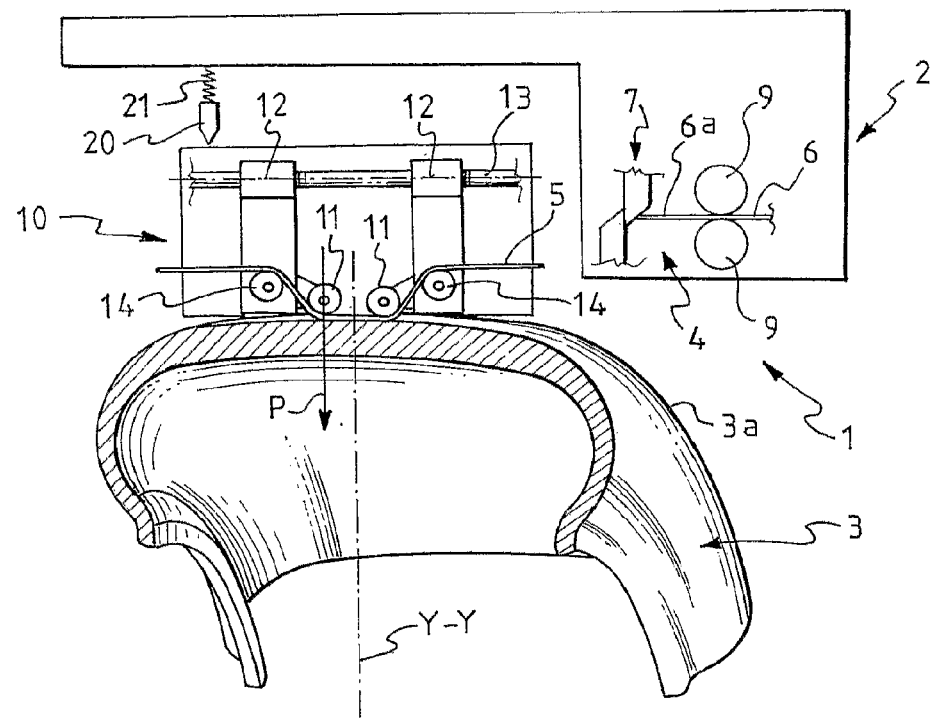
FIG. 1 schematically shows an embodiment of the apparatus according to the present invention in an operating step of the deposition cycle of the reinforcing elements on the forming support.

In FIG. 1, an example embodiment of an apparatus for making reinforcing structures for vehicle tyres in accordance with the present invention is wholly indicated with 1.

The apparatus 1 is part of a work station of the type described in document WO 01/36185 to the same Applicant.

In the described embodiment, the apparatus 1 is suitable for manufacturing a belt structure on a toroidal support 3 having an outer surface 3a substantially configured according to the internal configuration of the tyre to be obtained. The toroidal support 3 is not described in detail since it can be made in whatever suitable way by the man skilled in the art.

In the aforementioned embodiment, the reinforcing elements preferably consist of pieces 5 of predetermined length obtained through cutting operations carried out sequentially on at least one continuous strip-like element 6 coming from a drawing and/or calandering device, or from a feed reel. The continuous strip-like element 6, and consequently the pieces 5 obtained from it, each have a plurality of cords or similar made of metal or textile material, extending parallel to each other along the longitudinal extension of the strip-like element 6 and of the piece 5 itself, and they are at least partially coated by a layer of elastomeric material applied through a drawing and/or calandering operation.

It should be specified that, if needed, the apparatus 1 as well as the method carried out by it are also suitable for being used to make other reinforcing structures of the tyre, like for example the carcass structure.

In an alternative embodiment thereof that is not illustrated, the apparatus 1 of the present invention is used for the deposition of the bead cores for manufacturing the anchoring structures of the carcass structure. In such a case, the reinforcing elements preferably consist of a cord of metal or textile material coated with a layer of elastomeric material, hereafter known as rubberized cord. Such a rubberized cord is fed at the tyre in the form of a continuous element and is deposited at the bead of the tyre according to a substantially spiral progression through the action of a presser member suitably provided.

In the embodiment illustrated in the attached figures, before making the belt structure, a carcass structure (not illustrated in the drawings) is preferably built on the toroidal support 3. Such a structure can advantageously be formed on the toroidal support 3 for example according to what is described in patent EP 0 928 680 to the same Applicant.

One or more surface layers of entirely elastomeric material or material comprising one or more reinforcing elements incorporated in, or coated with, elastomeric material can have been built on the toroidal support 3, in addition to the carcass structure.

The apparatus 1 comprises a frame 2, schematically represented in the attached figures, on which at least one feed unit 4 is mounted, said feed unit being arranged to provide the strip-like pieces 5 of predetermined length from the continuous strip-like element 6.

The feed unit 4, in turn, comprises at least one cutting member 7 arranged to cut the continuous strip-like element perpendicularly or according to a predetermined inclination with respect to the longitudinal extension thereof, to obtain the individual strip-like pieces 5. At least one gripping member (not illustrated) that is mobile between a first work position in which it is intended to engage a terminal end 6a of the continuous strip-like element 6 at the cutting member 7, and a second work position in which it is positioned away from the cutting member itself, is combined with the cutting member 7. Following the translation from the first to the second work position, the gripping member drags the continuous strip-like element 6 so as to lay it beyond the cutting member 7 and preferably in a position radially close to the toroidal support 3, according to a portion of length corresponding to that of the strip-like piece 5 to be obtained following the subsequent actuation of the cutting member itself. Preferably, a pair of rollers, indicated with 9 in FIG. 1, operate on the continuous strip-like element 6 in a zone immediately upstream of the cutting member 7 to guide such a continuous strip-like element 6 towards such a cutting member 7.

The apparatus 1 further comprises at least one deposition unit 10 schematically represented in the attached figures, which is intended to sequentially engage each of the strip-like pieces 5 prepared in the way described previously, to deposit them on the outer surface 3a of the toroidal support 3.

Preferably, the deposition unit 10 comprises at least one presser member 11 that is mobile along the strip-like piece 5, in contrasting relationship against the outer surface 3a of the toroidal support 3. More specifically, in a preferred embodiment at least two rolling presser members 11 are used, each carried by a support element 12 that is mobile along a guide structure 13 upon the action of transversal moving devices, for example of the worm screw type, not illustrated since they can be made by the man skilled in the art in whatever convenient way.

An elastic element (not illustrated), having its own constant elasticity k is associated with each presser member 11, said elastic element preferably being a spring. When the presser members 11 are pressed against the outer surface 3a of the toroidal support 3 with a predetermined force F, a predetermined elongation of the spring equal to F/k is generated. Preferably, the elasticity constant k and the set force F are selected so that the aforementioned elongation is between about 2 mm and about 5 mm.

At least one auxiliary holding element 14, that is suitable for cooperating with the respective presser member 11 to hold the strip-like piece 5 in the time between the cutting of the latter upon the action of the cutting member 7 and the application onto the toroidal support 3, is also preferably associated with each support element 12. In greater detail, each auxiliary holding element 14 can for example consist of a small roller projecting from the respective support element 12 so as to provide a support seat for the elongated element 6 dragged by the gripping member and for the cut strip-like piece 5.

Radial moving devices, provided to translate the presser members 11 radially closer to the outer surface 3a of the toroidal support 3, are also associated with the deposition unit 10. Such radial moving devices are neither illustrated nor described in detail since they can be made in any way suitable for the man skilled in the art, and can for example operate on the guide structure 13 and/or directly on the presser members 11, in order to take the strip-like piece 5 in contact relationship on the outer surface 3a of the toroidal support 3.

Figure 2:
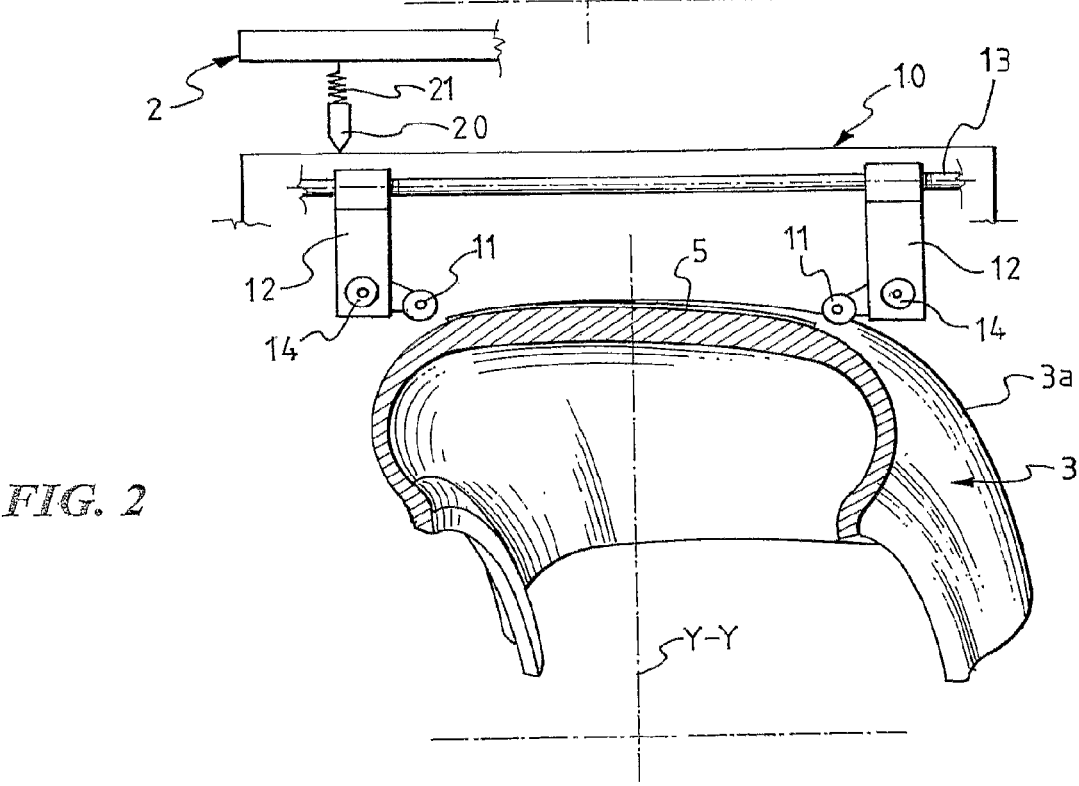
FIG. 2 schematically shows the apparatus of FIG. 1 in an operating step subsequent to that of FIG. 1.

Transversal moving devices are also provided, also not illustrated since they can be made in any suitable way, operating for example between the guide structure 13 and the blocks 12 to translate the presser members 11 between a first operating condition in which, according to FIG. 1, they are close together and a second operating condition in which, according to FIG. 2, they are moved apart with respect to an equatorial plane Y-Y of the toroidal support 3.

The apparatus 1 further comprises a control unit (not illustrated) to control the movement of the deposition unit 10 with respect to the toroidal support 3 and the movement of the presser members 11 from the first operating position, illustrated in FIG. 1, to the second operating position, illustrated in FIG. 2 along a predetermined deposition path.

Further details of the apparatus 1 and the preparation and deposition methods of each strip-like piece 5 on the toroidal support 3 are for example described in patent EP 1 147 007 to the same Applicant.

The Applicant has found that, in the absence of further provisions that shall be described hereafter, the deposition of the strip-like pieces 5 with an apparatus 1 of the type described above could not take place in an optimal manner.

Indeed, it should be specified that the deposition path is defined a priori through software based upon a theoretical deposition profile from the profile of the toroidal support 3. In particular, such software, having received a series of information identifying the theoretical deposition profile in input, processes such information to calculate the spatial coordinates of a series of points that define the deposition path.

Since in practice the actual deposition profile is different from the theoretical one, the deposition of the strip-like pieces 5 on the toroidal support 3 may not be optimal.

The Applicant has therefore implemented some provisions suitable for allowing the deposition of the strip-like pieces 5 on the toroidal support 3 to take place along a deposition path calculated based upon the actual deposition profile, for example corresponding to the profile of the toroidal support 3 supporting other structural components of the tyre being processed, for example liner, carcass ply/plies, bead cores, under-belt.

In accordance with the present invention, the apparatus 1 further comprises a detection device 20 suitable for detecting the deviations between the actual deposition profile and the theoretical deposition profile along the deposition path defined a priori based upon the theoretical deposition profile. The apparatus 1 also comprises a processing unit suitable for processing an actual deposition path of the strip-like pieces 5 on the toroidal support 3, based upon the detected deviations.

In its preferred embodiment, the detection device 20 is an electromechanical or optical position sensor. Such a sensor is integrally associated with the frame 2 of the apparatus and is active on the deposition unit 10 to detect the displacements of the presser members 11 along a predetermined pressing direction P. For such a purpose, the detection device 20 is associated with the frame 2 through the interposition of a conventional elastic element 21, for example a spring.

In the attached figures, the detection device 20 is positioned at the interface between the frame 2 and the deposition unit 10 so as to operate on the deposition unit 10. In such a configuration the presser members 11 are assumed to be integral, in the movement along the pressing direction P, with the other members of the deposition unit 10, i.e. that the displacements of the presser members 11 during the movement of these presser members 11 along the pressing direction P from the first operating position, illustrated in FIG. 1, to the second operating position, illustrated in FIG. 2, carry out into corresponding displacements of the entire deposition unit 10. The man skilled in the art shall understand that the position of the detection device 20 can in any case be different to the one represented. In particular, the detection device 20 can be positioned so as to act directly on the presser members 11 or on any other member of the deposition unit 10, provided that such a member is integral with the presser members 11 in the movement of these presser members along the pressing direction P.

The detection device 10, whenever a deviation between the actual deposition profile and the theoretical deposition profile is detected, generates an electrical signal representative of such deviations. Such an electric signal is sent to the processing unit that, based upon such a signal, corrects the spatial coordinates of those points of the theoretical deposition path at which the deviations have occurred.

As already stated, the apparatus 1 described above can be used for the deposition of the strip-like pieces 5 on the toroidal support 3 for manufacturing a belt structure of a tyre in a method for manufacturing a tyre for vehicle wheels.

Such a method initially comprises the step of building, on the toroidal support 3a, a carcass structure comprising at least one carcass ply. After such a step, it is carried out the step of building the belt structure in a radially outer position with respect to the carcass structure and thereafter it is carried out the step of building a tread band in a radially outer position with respect to the belt structure.

The steps of building the carcass structure and/or the belt structure comprise a deposition step of a plurality of strip-like pieces 5 on the outer surface 3a of the toroidal support 3. Such a step initially provides for the definition of a theoretical deposition path based upon the theoretical deposition profile.

As already stated, the theoretical deposition path is calculated through a calculation algorithm that, based upon a series of identifying information of a theoretical toroidal support and of the tyre to be built, calculates the spatial coordinates of a series of points defining the aforementioned theoretical deposition path.

Thereafter, the control unit acts upon the deposition unit to move the presser members 11 into a predetermined position in contact on the toroidal support 3. Such a position defines an initial position of the theoretical deposition path. In this step, the detection device is set at zero.

Thereafter, the presser members 11 are moved along the theoretical deposition path to carry out an initial setting cycle of the machine. At the same time as such a displacement, the detection device detects the deviations between theoretical deposition profile and actual deposition profile along a predetermined pressing direction P and generates an electric signal representative of such deviations. Such a signal is sent to the processing unit, which then provides for correcting the spatial coordinates of those points of the theoretical deposition path in which the deviations have occurred.

An actual deposition path is thus defined.

In the preferred embodiment of the method of the present invention, the correction of the spatial coordinates of the theoretical deposition path is carried out only if the detected deviations are outside a predetermined tolerance range, for example between about −1.5 mm and about +1.5 mm, preferably between about −0.5 mm and about +0.5 mm.

At this point the actual deposition step of the strip-like pieces 5 begins. In such a step, the control unit provides for moving the presser members 11 along the actual deposition path calculated previously.

In the case of the deposition of the bead cores to make an anchoring structure of the carcass structure, a rubberized cord preferably consisting of a thread-like element made of metal or textile material coated with a layer of elastomeric material is fed at the toroidal support 3. Such a rubber cord is fed at the tyre in the form of a continuous element and is deposited at the bead of the tyre according to a substantially spiralling progression through the action of a suitably provided presser member.

The first deposition cycle (corresponding to the first turn of the spiralling path) is carried out based upon the theoretical deposition path calculated a priori in the way described above. Whilst such a cycle is being carried out the deviations between actual deposition profile and theoretical deposition profile are detected.

Thereafter, the steps of correction of the theoretical deposition path and of actual deposition are carried out according to what is illustrated above.

What is claimed is:

1. An apparatus for the deposition of at least one reinforcing element on a forming support, comprising:
    at least one feeding unit of at least one reinforcing element at a forming support;
    at least one deposition unit of said at least one reinforcing element on said forming support, said at least one deposition unit comprising at least one presser member;
    a control unit of said at least one deposition unit;
    at least one detection device of the deviations between an actual deposition profile and a theoretical deposition profile along a first deposition path defined based upon said theoretical profile; and
    a processing unit to define, based upon said deviations, an actual deposition path of said at least one reinforcing element on said forming support;
    wherein the control units controls the at least one presser member to move with respect to the forming support along the first deposition path to carry out an initial setting cycle of the apparatus prior to commencing deposition of the at least one reinforcing element and along the actual deposition path for depositing the at least one reinforcing element.

2. The apparatus according to claim 1, wherein said at least one detection device comprises at least one electromechanical position sensor.

3. The apparatus according to claim 1, wherein said at least one detection device comprises at least one optical position sensor.

4. The apparatus according to claim 1, wherein said at least one detection device is integrally associated with a frame of said apparatus and is active on said at least one deposition unit to detect the displacements of said at least one presser member along a predetermined pressing direction.

5. The apparatus according to claim 1, further comprising a cutting member to cut a plurality of pieces of predetermined length of said at least one reinforcing element on said forming support from at least one substantially continuous element; and
    wherein at least two presser members comprises at least two presser members that are mobile away from each other to apply said pieces on said forming support.

6. The apparatus according to claim 5, wherein said at least two presser members are rolling presser members.

7. The apparatus according to claim 1, wherein said forming support is a toroidal drum.

8. The apparatus according to claim 1, wherein said forming support is a cylindrical drum.

9. An apparatus for the deposition of at least one reinforcing element on a forming support, the apparatus comprising:
    at least one feeding unit of at least one reinforcing element at a forming support;
    at least one deposition unit of said at least one reinforcing element on said forming support, said at least one deposition unit comprising at least one presser member;
    a control unit of said at least one deposition unit;
    at least one detection device of the deviations between an actual deposition profile and a theoretical deposition profile along a first deposition path defined based upon said theoretical profile; and
    a processing unit to define, based upon said deviations, an actual deposition path of said at least one reinforcing element on said forming support;
    wherein the at least one presser member is configured to move with respect to the detection device from a first position to a second position along the actual deposition path.

10. The apparatus according to claim 9, wherein said at least one detection device comprises at least one electromechanical position sensor.

11. The apparatus according to claim 9, wherein said at least one detection device comprises at least one optical position sensor.

12. The apparatus according to claim 9, wherein said at least one detection device is integrally associated with a frame of said apparatus and is active on said at least one deposition unit to detect the displacements of said at least one presser member along a predetermined pressing direction.

13. The apparatus according to claim 9, further comprising a cutting member to cut a plurality of pieces of predetermined length of said at least one reinforcing element on said forming support from at least one substantially continuous element; and
    wherein the at least one presser member comprises at least two presser members that are mobile away from each other to apply said pieces on said forming support.

14. The apparatus according to claim 13, wherein said at least two presser members are rolling presser members.

15. The apparatus according to claim 9, wherein said forming support is a toroidal drum.

16. The apparatus according to claim 9, wherein said forming support is a cylindrical drum.

* * * * *